US010286948B2

(12) United States Patent
Yang et al.

(10) Patent No.: US 10,286,948 B2
(45) Date of Patent: May 14, 2019

(54) ARRANGEMENT AND METHOD FOR PREVENTING FALSE DETECTION OF ELECTRONIC STABILITY CONTROL PRIMARY CIRCUIT LOSS

(71) Applicant: Continental Automotive Systems, Inc., Auburn Hills, MI (US)

(72) Inventors: Ying Yang, Rochester Hills, MI (US); Bo Ye, Rochester Hills, MI (US); Michael Gerhard Schneider, Rossdorf (DE); Clinton Schumann, Holly, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 358 days.

(21) Appl. No.: 15/377,548

(22) Filed: Dec. 13, 2016

(65) Prior Publication Data

US 2017/0174256 A1 Jun. 22, 2017

Related U.S. Application Data

(60) Provisional application No. 62/268,731, filed on Dec. 17, 2015.

(51) Int. Cl.
*B62D 5/04* (2006.01)
*B60T 8/1755* (2006.01)
(Continued)

(52) U.S. Cl.
CPC .......... *B62D 5/0481* (2013.01); *B60T 8/1755* (2013.01); *B60T 8/885* (2013.01);
(Continued)

(58) Field of Classification Search
None
See application file for complete search history.

(56) References Cited

U.S. PATENT DOCUMENTS

| | | | | |
|---|---|---|---|---|
| 6,856,885 B2 * | 2/2005 | Lin | ........................ | B60T 8/172 303/146 |
| 6,856,886 B1 * | 2/2005 | Chen | ...................... | B60T 8/172 303/146 |

(Continued)

FOREIGN PATENT DOCUMENTS

| | | |
|---|---|---|
| WO | 200046087 A1 | 8/2000 |
| WO | 2005056360 A1 | 6/2005 |

OTHER PUBLICATIONS

The International Search Report and the Written Opinion of the International Searching Authority dated Mar. 17, 2017 for corresponding application No. PCT/US2016/066544.

*Primary Examiner* — Shelley Chen

(57) ABSTRACT

A method of detecting for primary circuit loss of an electronic stability control system for a vehicle comprises checking that a lateral acceleration sensor is installed and working properly, a yaw sensor is installed and working properly, and a steering wheel angle sensor is installed and working properly. An absolute value of the lateral acceleration sensor is compared with a first pre-defined threshold, an absolute value of the yaw sensor is compared with a second pre-defined threshold, and an absolute value of the steering wheel angle sensor is compared with a third pre-defined threshold. It is determined that primary circuit loss detection is not required when any of the three sensors are equal to and above the respective pre-defined thresholds and that primary circuit loss detection is required when all of the three sensors are below the respective pre-defined threshold.

10 Claims, 2 Drawing Sheets

(51) Int. Cl.
*B60T 8/88* (2006.01)
*B60T 17/22* (2006.01)
(52) U.S. Cl.
CPC ....... *B60T 17/221* (2013.01); *B60T 2270/403* (2013.01); *B60T 2270/413* (2013.01)

(56) References Cited

U.S. PATENT DOCUMENTS

| | | | |
|---|---|---|---|
| 7,561,951 B2* | 7/2009 | Rao | B60W 50/0205 180/268 |
| 9,031,754 B2* | 5/2015 | Matoy | B60T 8/1708 701/70 |
| 2001/0044688 A1 | 11/2001 | Okita et al. | |
| 2003/0204293 A1* | 10/2003 | Shiino | B60G 17/0162 701/37 |
| 2004/0199321 A1* | 10/2004 | Lin | B60T 8/172 701/70 |
| 2006/0020378 A1 | 1/2006 | Salman et al. | |
| 2007/0067078 A1 | 3/2007 | Salman et al. | |
| 2009/0069978 A1* | 3/2009 | Inage | B60T 8/17551 701/41 |
| 2012/0197507 A1* | 8/2012 | Custer | B60K 31/0008 701/96 |
| 2013/0085649 A1* | 4/2013 | Matoy | B60T 8/1708 701/70 |
| 2014/0067217 A1* | 3/2014 | Stares | B60K 23/0808 701/69 |
| 2014/0100750 A1* | 4/2014 | Stares | B60K 17/34 701/69 |
| 2015/0142234 A1* | 5/2015 | Hara | B60W 50/082 701/22 |
| 2017/0015350 A1* | 1/2017 | Bourdrez | B62D 5/0463 |

* cited by examiner

ARRANGEMENT AND METHOD FOR PREVENTING FALSE DETECTION OF ELECTRONIC STABILITY CONTROL PRIMARY CIRCUIT LOSS

CROSS REFERENCE TO RELATED APPLICATIONS

This U.S. patent application claims the benefit of U.S. provisional patent application No. 62/268,731, filed Dec. 17, 2015, which is hereby incorporated by reference.

TECHNICAL FIELD

The present disclosure relates to automotive vehicles, and more particularly to electronic stability control systems for automotive vehicles.

BACKGROUND

An automotive vehicle may include sensor arrays and cameras mounted to the vehicle to detect objects in the area around the vehicle for various safety systems for the vehicle and the driver.

The detection of Primary Circuit Loss (PCL) is a required function in a Anti-lock Brake System (ABS) and an Electronic Stability Control (ESC) System. Currently the detection algorithm has strict conditions in PCL recognition in order to prevent false detection of PCL. If PCL is detected, the analog control mode for inlet valves in a hydraulic unit of the brake system will be disabled. As a result, the brake pump will run with much faster speed, which will generate louder noise. Additionally, the pressure model for pressure control of the brake system will be switched to a fallback mode during that stop cycle. However, in spite of the strict conditions for detecting PCL testing data shows that false detection of PCL can still occur in extreme maneuvers.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method of detecting for primary circuit loss of an electronic stability control system for a vehicle comprises checking that a lateral acceleration sensor is installed and working properly, a yaw sensor is installed and working properly, and a steering wheel angle sensor is installed and working properly. An absolute value of the lateral acceleration sensor is compared with a first pre-defined threshold, an absolute value of the yaw sensor is compared with a second pre-defined threshold, and an absolute value of the steering wheel angle sensor is compared with a third pre-defined threshold. It is determined that primary circuit loss detection is not required when any of the three sensors are equal to and above the respective pre-defined thresholds and that primary circuit loss detection is required when all of the three sensors are below the respective pre-defined threshold.

An electronic stability control system comprises a lateral acceleration sensor capable of measuring lateral acceleration of the vehicle, a yaw sensor capable of measuring yaw of the vehicle, a steering wheel angle sensor capable of measuring a steering angle of the vehicle, and an electronic control unit connected to the lateral acceleration sensor, yaw sensor, and steering wheel angle sensor. The electronic control unit is configured with instructions for: checking that a lateral acceleration sensor is installed and working properly, a yaw sensor is installed and working properly, and a steering wheel angle sensor is installed and working properly. An absolute value of the lateral acceleration sensor is compared with a first pre-defined threshold, an absolute value of the yaw sensor is compared with a second pre-defined threshold, and an absolute value of the steering wheel angle sensor is compared with a third pre-defined threshold. It is determined that primary circuit loss detection is not required when any of the three sensors are equal to and above the respective pre-defined thresholds and that primary circuit loss detection is required when all of the three sensors are below the respective pre-defined threshold.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
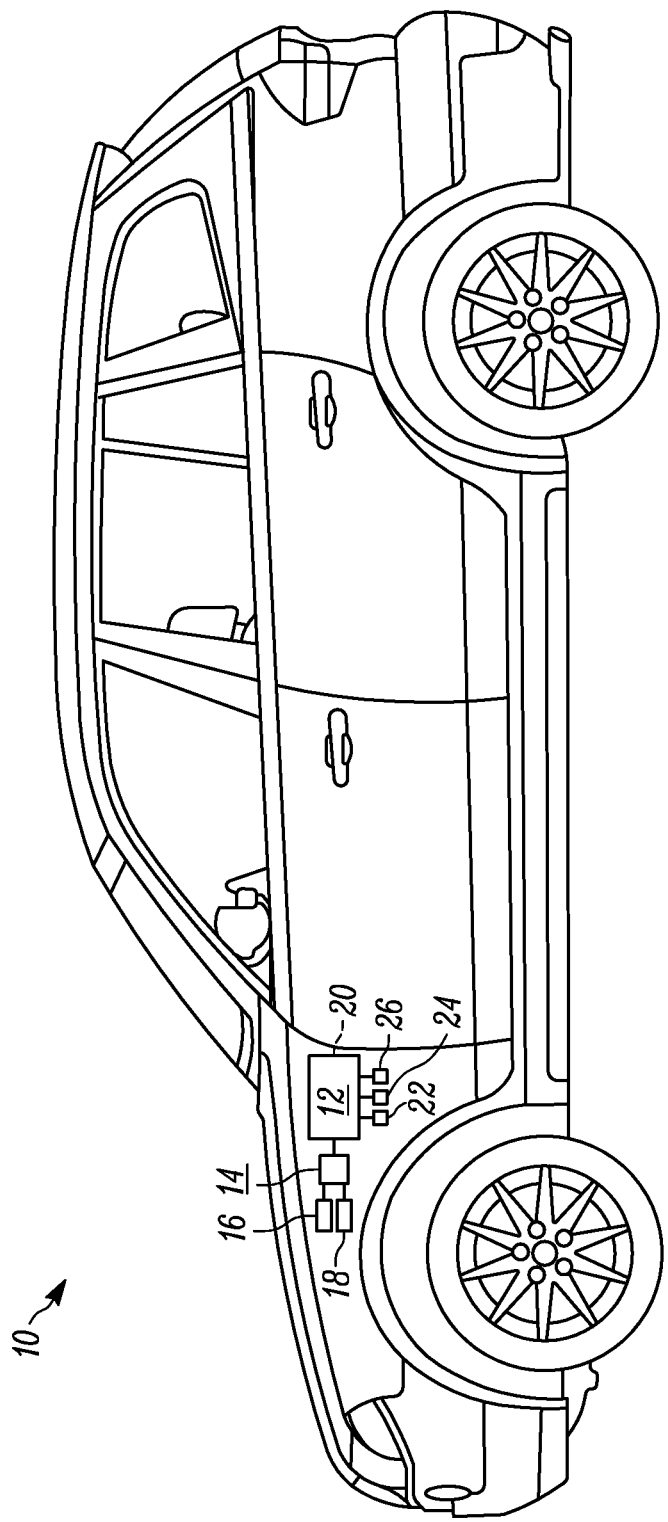
FIG. 1 is a schematic side view of a vehicle having a thief primary circuit loss detection of the present invention.
Figure 2:
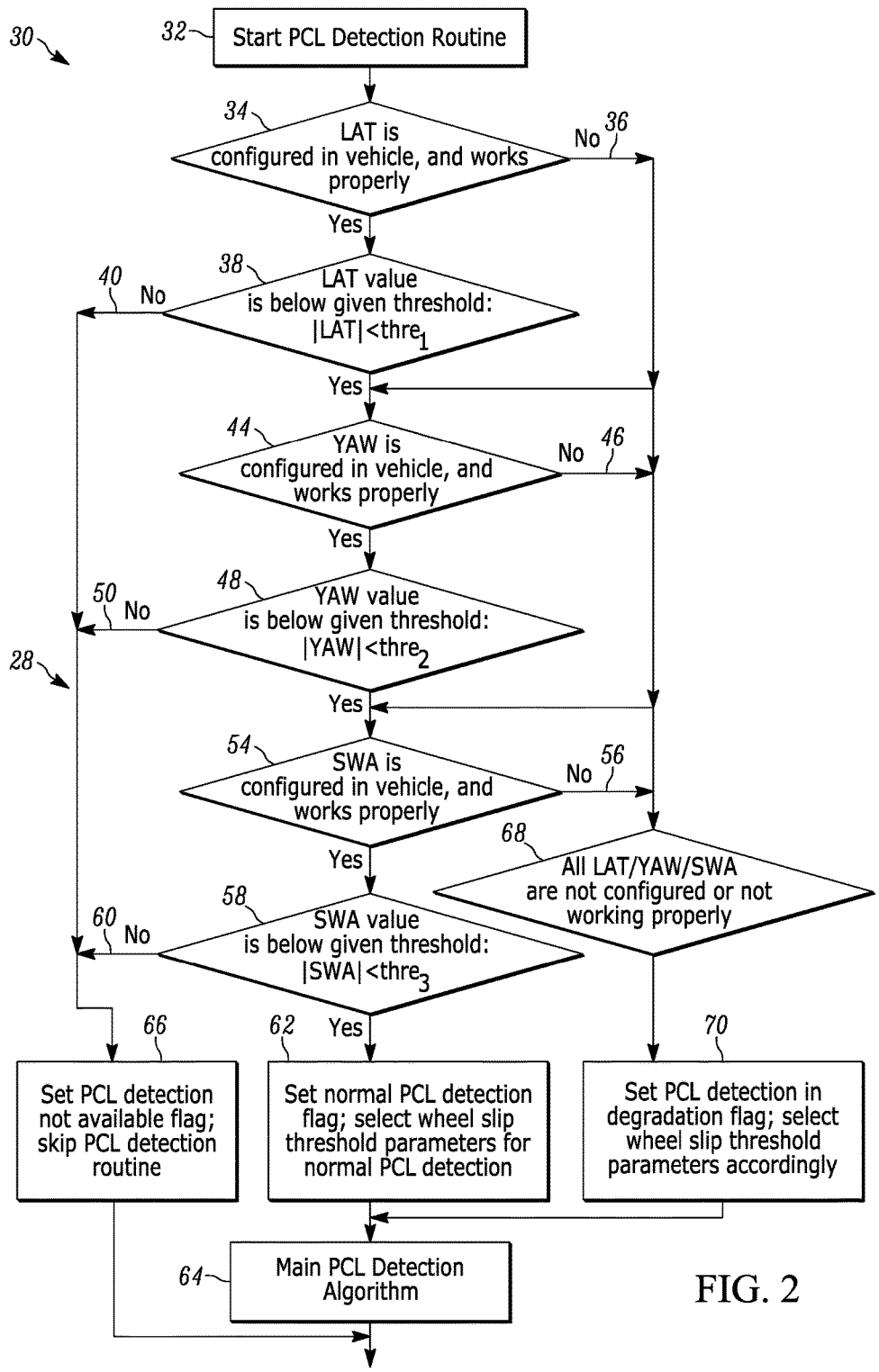
FIG. 2 is a schematic flow chart illustration of a method for primary circuit loss detection of FIG. 1.

The following description is merely exemplary in nature and is in no way intended to limit the disclosure, its application, or uses. For purposes of clarity, the same reference numbers will be used in the drawings to identify similar elements. FIGS. 1-2 are schematic illustrations of a vehicle 10 having an electronic stability control system (ESC) 12 and/or an anti-lock brake system (ABS). For purposes of this application the ABS is included in the function of the ESC system 12. However, the ABS may be a stand-alone system with a separate electronic control unit (ECU). In either arrangement, detection of primary circuit loss (PCL) occurs in the manner described below.

The ESC 12 preferably incorporates other existing vehicle 10 systems and may be utilize the same sensors and components. In particular, an electronic brake system (EBS) 14 having a pump and motor assembly 16. The ESC system 12 includes an electronic control unit 18. The ECU 18 may be a common with the EBS 14 or a separate ECU.

A primary circuit 20 for control of the ESC 12 is essential to the operation of the ESC 12. Because the ESC 12 is a safety system related to braking and brake control detection of PCL is a required function of the ESC 12. When PCL is detected the ESC 12 operates in a fallback mode for that brake/stability cycle. However, it is ideal to avoid operating in the fallback mode unless absolutely necessary.

The ECU 18 for the ESC 12 utilizes a plurality of sensors and vehicle data to control the system 12 and to detect PCL. Among those sensors are at least a lateral acceleration (LAT) sensor 22, a steering wheel angle (SWA) sensor 24, and a yaw rate (YAW) sensor 26.

The condition where detection of PCL is most important is during straight line stops. However, the false detection of PCL typically happens in extreme maneuvers. During straight line stops the value readings from the LAT sensor 22, SWA sensor 24, and YAW sensor 26 are small. Conversely, in extreme maneuvers large value reading from LAT 22, SWA 24 and YAW 26 incur. Utilizing these three types of sensors 22, 24, 26 and factoring in the expected differences of the output values into the PCL algorithm 28 can provide a more robust method for detecting PCL. Additionally, since three sensors 22, 24, 26 are use there is a significant safety margin in case any of the three sensors 22, 24, 26 are failed.

A method for detecting PCL is described herein, shown at 30. The PCL detection routine is started by the ECU 18, shown at 32. The ECU 18 first checks if the ABS/ESC 12 is equipped with the LAT sensor 22. If a LAT sensor 22 is installed in vehicle 10, then the ECU 18 further checks if the LAT sensor 22 is working properly, shown at 34 (Yes=Lat_acc_cog_sens_available is set to True). If the LAT sensor 22 is not installed and working properly (No) the PCL detection 30 will move on to the other sensors 24 and 26, shown at 36. Therefore, only after passing these two logic checks (present and working), will the algorithm 30 further evaluate the absolute value of LAT sensor 22 and compare it with a first pre-defined threshold (thre$_1$), shown at 38. If the absolute value of the LAT 22 is smaller than the threshold (thre$_1$), the PCL detection process will keep active (YES). Otherwise, PCL detection process is disabled in that control loop (No), shown at 40.

These steps are repeated for the SWA sensor 24 (Swa_sens_available) and YAW sensor 26 (Yaw_sens_available) as well, with two pre-defined thresholds (thre$_2$ and thre$_3$) for those two sensors 24 and 26 as described below.

The ECU 18 checks if the ABS/ESC 12 is equipped with the SWA sensor 24 and if SWA sensor is installed in vehicle, then further check if SWA sensor 24 is working properly, shown at 44 (Yes=SWA_sens_available is set to True). If the SWA sensor 24 is not installed and working properly (No) the PCL detection will move on to the next sensor 26, shown at 46. Therefore, only after passing these two logic checks (present and working), will the algorithm further evaluate the absolute value of SWA sensor 24 and compare it with a second pre-defined threshold (thre$_2$), shown at 48. If the absolute value of SWA sensor 24 is smaller than the threshold (thre$_2$), the PCL detection process will keep active (YES). Otherwise, PCL detection process is disabled in that control loop (No), shown at 50.

Next, the ECU 18 checks if the ABS/ESC 12 if the YAW sensor 26 is installed in vehicle 10, then further check if the YAW sensor 26 is working properly, shown at 54 (Yes=YAW_sens_available is set to True). If the YAW sensor 26 is not installed and working properly (No) the PCL detection will move on, shown at 56. Therefore, only after passing these two logic checks (present and working), will the algorithm further evaluate the absolute value of YAW sensor 26 and compare it with a third pre-defined threshold (thre$_3$), shown at 58. If the absolute value of the YAW sensor 26 is smaller than the threshold (thre$_3$), the PCL detection process will keep active (YES). Otherwise, PCL detection process is disabled in that control loop (No), shown at 60.

Adding the three logic AND conditions, one for each sensor 22, 24, 26 to existing logic conditions in the algorithm 30 will filter out the extreme maneuvers from PCL detection, and prevent false PCL detections in those situations. If any of the sensors 22, 24, 26 exceed the thresholds the ECU 18 will determine an extreme maneuver is occurring and PCL detection is unnecessary. Therefore, the main PCL algorithm will only be evaluated in straight line maneuvers, where the PCL is important.

With those three new logic conditions added to a detection algorithm, the current thresholds, e.g. wheel slip, etc, for the Main PCL Algorithm 64 could be evaluated and relaxed to have a faster and more accurate PCL detection in situations where it is important, i.e. straight line maneuvers where the three thresholds (thre$_1$, thre$_2$ and thre$_3$) are not met. Therefore, if all three sensors are present and the three thresholds (thre$_1$, thre$_2$ and thre$_3$) are all not met or exceeded then a normal PCL detection flag is set, shown at 62, and wheel slip threshold parameters are selected. The PCL detection routine then moves on to the main PCL detection algorithm, shown at 64.

If any of the three sensors 22, 24, 26 are available and any one of the thresholds (thre$_1$, thre$_2$ and thre$_3$) are met or exceeded, the PCL Detection Routine 32 is set as not available, shown at 66. These sensor outputs would indicate extreme maneuvers where PCL detection is not needed. Further if none of the sensors 22, 24, 26 are available or working, shown at 68, the ECU 18 sets a flag for PCL degradation. The ECU 18 cannot stop the PCL detection since it is unable to determine if an extreme maneuver is occurring. Therefore, the ECU 18 sets the flag and selects a wheel slip threshold parameter for the main PCL algorithm accordingly, shown at 70. The PCL detection routine 32 ends and the ECU 18 moves on to the main PCL detection Algorithm, shown at 64.

Additionally, with the safeguard from checking the three sensors 22, 24, 26, current PCL detection conditions and variable thresholds could be relaxed to improve PCL detection. Therefore, the system 12 and method 30 described above provides faster and more accurate PCL detection while at the same time providing a more robust arrangement for prevent PCL false detection While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A method of detecting for primary circuit loss of an electronic stability control system for a vehicle comprising:
   checking that a lateral acceleration sensor is installed and working properly;
   comparing an absolute value of the lateral acceleration sensor with a first pre-defined threshold;
   checking that a yaw sensor is installed and working properly;
   comparing an absolute value of the yaw sensor with a second pre-defined threshold;
   checking that a steering wheel angle sensor is installed and working properly;
   comparing an absolute value of the steering wheel angle sensor with a third pre-defined threshold;
   determining that primary circuit loss detection is not required when any of the three sensors are equal to and above the respective pre-defined threshold; and determining that primary circuit loss detection is required when all of the three sensors are below the respective pre-defined threshold.

2. The method of claim 1, further comprising selecting a wheel slip threshold for a main primary circuit loss detection algorithm when primary circuit loss detection is required.

3. The method of claim 1, further comprising starting a main primary circuit loss detection algorithm when primary circuit loss detection is required.

4. The method of claim 1, further comprising setting a degradation flag when any of the lateral acceleration sensor, the yaw sensor, and the steer wheel angle sensor are not working properly.

5. The method of claim 1, further comprising setting a degradation flag when all of the lateral acceleration sensor, the yaw sensor, and the steer wheel angle sensor are not working properly.

6. An electronic stability control system comprising:
   a lateral acceleration sensor capable of measuring lateral acceleration of the vehicle;
   a yaw sensor capable of measuring yaw of the vehicle;
   a steering wheel angle sensor capable of measuring a steering angle of the vehicle;
   an electronic control unit connected to the lateral acceleration sensor, yaw sensor, and steering wheel angle sensor, wherein the electronic control unit is configured with instructions for;
   checking that the lateral acceleration sensor is installed and working properly;
   comparing an absolute value of the lateral acceleration sensor with a first pre-defined threshold;
   checking that the yaw sensor is installed and working properly;
   comparing an absolute value of the yaw sensor with a second pre-defined threshold;
   checking that the steering wheel angle sensor is installed and working properly;
   comparing an absolute value of the steering wheel angle sensor with a third pre-defined threshold;
      determining that primary circuit loss detection is not required when any of the three sensors are equal to and above the respective pre-defined threshold; and
      determining that primary circuit loss detection is required when all of the three sensors are below the respective pre-defined threshold.

7. The electronic stability control system of claim 6, wherein the electronic control unit is further configured with instructions for: selecting a wheel slip threshold for a main primary circuit loss detection algorithm when primary circuit loss detection is required.

8. The electronic stability control system of claim 6, wherein the electronic control unit is further configured with instructions for starting a main primary circuit loss detection algorithm when primary circuit loss detection is required.

9. The electronic stability control system of claim 6, wherein the electronic control unit is further configured with instructions for setting a degradation flag when any of the lateral acceleration sensor, the yaw sensor, and the steer wheel angle sensor are not working properly.

10. The electronic stability control system of claim 6, wherein the electronic control unit is further configured with instructions for setting a degradation flag when all of the lateral acceleration sensor, the yaw sensor, and the steer wheel angle sensor are not working properly.

* * * * *